(12) United States Patent (10) Patent No.: US 8,190,177 B2
Willey et al. (45) Date of Patent: May 29, 2012

(54) PAGING A MOBILE STATION INDIVIDUALLY AND USING BROADCAST PAGES

(75) Inventors: William Daniel Willey, Gilroy, CA (US); Zhijun Cai, Euless, TX (US)

(73) Assignee: Research in Motion Limited, Waterloo, Ontario (CA)

( * ) Notice: Subject to any disclaimer, the term of this patent is extended or adjusted under 35 U.S.C. 154(b) by 786 days.

(21) Appl. No.: 11/972,510

(22) Filed: Jan. 10, 2008

(65) Prior Publication Data

US 2009/0181700 A1 Jul. 16, 2009

(51) Int. Cl.
*H04W 68/00* (2009.01)
*H04W 4/00* (2009.01)
*H04B 7/00* (2006.01)

(52) U.S. Cl. ......... 455/458; 455/466; 455/515; 455/520

(58) Field of Classification Search ............. 455/418, 455/422.1, 426.1, 458, 461, 466, 500, 502–503, 455/550.1, 554.1, 556.2, 560–561, 412.2, 455/420, 515–521
See application file for complete search history.

(56) References Cited

U.S. PATENT DOCUMENTS

| | | | |
|---|---|---|---|
| 6,195,573 B1 | 2/2001 | Cassidy et al. | |
| 6,363,242 B1 * | 3/2002 | Brown et al. | 455/70 |
| 6,421,540 B1 * | 7/2002 | Gilhousen et al. | 455/458 |
| 6,731,943 B1 | 5/2004 | McCormick et al. | |
| 6,795,425 B1 | 9/2004 | Raith | |
| 7,177,654 B2 | 2/2007 | Stenberg | |
| 7,711,377 B2 * | 5/2010 | Laroia et al. | 455/458 |
| 2004/0152476 A1 * | 8/2004 | Kuwano et al. | 455/459 |
| 2004/0227618 A1 * | 11/2004 | Hwang et al. | 340/7.46 |
| 2005/0186959 A1 | 8/2005 | Vialen et al. | |
| 2005/0277429 A1 | 12/2005 | Laroia et al. | |
| 2006/0104225 A1 * | 5/2006 | Kim et al. | 370/313 |
| 2007/0015523 A1 * | 1/2007 | Prakash et al. | 455/458 |
| 2007/0254679 A1 | 11/2007 | Montojo et al. | |
| 2008/0032713 A1 * | 2/2008 | Yang | 455/458 |
| 2008/0182596 A1 * | 7/2008 | Wang et al. | 455/458 |
| 2008/0188247 A1 * | 8/2008 | Worrall | 455/458 |
| 2010/0202382 A1 | 8/2010 | Park et al. | |

FOREIGN PATENT DOCUMENTS

| | | |
|---|---|---|
| KR | 1020050025039 | 3/2005 |
| WO | 0030375 | 5/2000 |
| WO | 2006030290 | 3/2006 |

OTHER PUBLICATIONS

International Search Report and Written Opinion of the International Searching Authority issued in International Application No. PCT/US2009/030619 on Aug. 24, 2009; 10 pages. International Preliminary Report on Patentability under Chapter I issued in International Application No. PCT/US2009/030619 on Jul. 22, 2010; 8 pages.
Extended European Search Report issued in European Application No. 08152861.4 on Nov. 5, 2008; 5 pages.
Communication under Rule 71(3) EPC issued in European Application No. 08152861.4 on Jul. 7, 2010; 43 pages.

* cited by examiner

*Primary Examiner* — Meless Zewdu
(74) *Attorney, Agent, or Firm* — Fish & Richardson P.C.

(57) ABSTRACT

An apparatus and a method for facilitating paging of a mobile station that is capable of being paged either pursuant to an individually-directed page or pursuant to a broadcast page. The page that is generated is of bits that permit unambiguous determination by a mobile station when the mobile station receives an individually-directed page and when the mobile station receives a broadcast page. When bits that are to be used in a page are created at the network, a determination is made as to whether the bits correspond to the bits of a broadcast page. If the bits correspond, the bits of the generated bits are altered.

16 Claims, 9 Drawing Sheets

PAGING A MOBILE STATION INDIVIDUALLY AND USING BROADCAST PAGES

The present disclosure relates generally to a manner by which to page a mobile station both with an individually-directed page and with a broadcast page. More particularly, the present disclosure relates to an apparatus, and an associated methodology, by which to generate and to detect, page messages that page the mobile station pursuant to an individually directed communication service or a broadcast communication service.

The page messages are formed to enable a mobile station to unambiguously determine when the mobile station is paged with an individually-directed page and when the mobile station is paged with a broadcast page.

BACKGROUND OF THE INVENTION

Technological advancements have, through the course of history, brought about many changes that have benefited almost all aspects of human endeavor. Advancements in communication technologies, e.g., have permitted the development and deployment of many varied types of communication systems. Their implementation has permitted the improved communication capacities of existing communication systems and the introduction of communication systems. Communications are possible at almost any location, between widely-dispersed parties, and to provide many varied types of communication services.

Cellular, and cellular-like, mobile communication systems are exemplary of communication systems made possible as a result of advancements in communication technologies. Successive generations of cellular communication systems have been developed and deployed with each generation taking advantage of available communication technologies. While early-generation communication systems provided primarily voice communication services and only limited data communication services, newer-generation systems provide increased data services. Cellular mobile radio communication systems are, as a result, increasingly used, not just for voice services, but also for data communication services.

Communications are typically carried out by a user through use of a mobile station. A mobile station is a radio transceiver, typically of dimensions permitting its convenient carriage and operation by the user. The mobile station is powered by a portable power supply that is carried together with, and forms part of, the mobile station. The portable power supply stores a finite amount of energy. During operation of the mobile station, the stored energy of the portable power supply is depleted, and the power supply must be recharged or replaced once the stored energy is depleted to an extent that limits, or prevents, the continued operation of the mobile station. To increase the operational period of a mobile station, efforts are made to reduce its energy requirements.

For instance, efforts are made to maintain the mobile station in a low-power mode in which circuit parts of the mobile station are not powered, except when needed. Schemes have been developed, e.g., relating to monitoring, by a mobile station, for a pending communication service for reducing power consumption. For example, a mobile station is maintained in the low-power, sometimes referred to as a sleep mode, but the mobile station periodically wakes up to monitor a paging channel to determine whether the mobile station is paged. If the mobile station is not paged, the mobile station returns to a sleep, or other low-power, mode, thereby to minimize power dissipation.

The page of the mobile station must appropriately identify the mobile station so that the mobile station is aware that it, and not a different mobile station, is being paged. At least one proposed system provides for a two-stage paging scheme in which two different channels are used to send a page to page a mobile station. The 3GPP ($3^{rd}$ Generation Partnership Project) is considering proposals for a new air interface, referred to as Long Term Evolution (LTE). In the proposed paging scheme, the mobile station, referred to as a UE (User Equipment), wakes up and monitors a first channel. Assignment information, if sent thereon, provides information usable by the UE to then monitor the second paging channel. Proposals provide for the communication on the first paging channel of a group address, referred to as a PI-RNTI or Paging Indication Radio Network Temporary Identifier. More than one UE might share the same address. Any UE that detects the group address communicated on the first paging channel then also monitors the second paging channel for a page message sent thereon. In one existing proposal, a unique identifier, such as a 32-bit TMSI (Temporary Mobile Station Identity), is sent on the second paging channel to page the mobile station. Because the unique identifier uniquely identifies the UE, only the UE that is intended to be paged is paged by the transmission. The second paging channel is, however, also used for traffic services, such as the communication of voice traffic or data traffic. The use of a lengthy, unique identifier to identify the UE that is paged therefore comes at the expense of capacity on the channel also to be used for a traffic service.

Additionally, proposals have been made also to provide a broadcast page, to page many, or all, mobile stations within a cell or other coverage area. Existing proposals, however, fail to provide a paging scheme that ensures that a broadcast page will not be confused with an individually-directed page or vice versa.

If a manner could be provided by which better to ensure that a broadcast message shall unambiguously be detected as such by a mobile station and to ensure that an individually-directed page shall be detected as such by a mobile station, improved communications would result.

It is in light of this background information related to paging by an access network of an access terminal that the significant improvements of the present disclosure have evolved.

DETAILED DESCRIPTION

The present disclosure, accordingly, advantageously provides an apparatus, and an associated methodology, by which to page a mobile station both with an individually-directed page and with a broadcast page.

Through operation of an embodiment of the present disclosure, a manner is provided by which to generate, and to detect, page messages that page the mobile station pursuant to an individually-directed communication service or a broadcast communication service. Values of the page message are selected in a manner that ensures better that a mobile station that detects a transmitted page does not erroneously identify a broadcast page as an individually-directed page or to mistake delivery of an individually-directed page as a broadcast page.

In one aspect of the present disclosure, one or more addresses, such as PI-RNTI addresses defined in a 3GPP LTE ($3^{rd}$ Generation Partnership Project Long Term Evolution), are reserved to be used for broadcasting purposes. That is to say, when a communication service is to be broadcast to a plurality, e.g., many or all of the mobile stations within a selected area, an address reserved for broadcasts is communicated.

In another aspect of the present disclosure, when a broadcast page is to be generated, a reserved address is utilized in the page that is generated and sent by a network part of a communication system. A mobile station that receives the page message that is indicative of a broadcast page is alerted to the immanency of the broadcast service.

In another aspect of the present disclosure, when an individually-directed page is to be generated, a hasher hashes bits that uniquely identify the mobile station that is to be paged to form a group of hashed bits. The first group of hashed bits are compared with reserved bits that are reserved for the addresses of broadcast pages. If the comparison indicates the first group of hash bits to differ with those of the reserved address or addresses, the first group of hashed bits is used to form a paging message sent on a first paging channel.

If, conversely, the first group of hashed bits is determined to correspond to, i.e., be of the same bits as the reserved addresses, then, the first group of hashed bits is altered so that the bits are dissimilar to those with any reserved address.

In another aspect of the present disclosure, an alterer alters the first group of hashed bits in a selected manner to make the bits differ with those of the reserved address. For instance, a bit of the first group of bits is altered to make the group dissimilar to the bits of the reserved address. Or, the bits are rotated by one or more bits. Or, logical operation, such as an exclusive OR operation is performed upon the first group of hashed bits. The logical operation is performed, for instance, using a set logical value.

In another aspect of the present disclosure, the bits that are sent, pursuant to the two-page paging scheme, together include all of the bits that uniquely define the mobile station that is paged. The bits that are sent together define, for instance, a TMSI, an IMSI, or other bit that uniquely identifies the mobile station. Thereby, through appropriate recombination of the bits that are sent pursuant to the two-stage paging scheme, the mobile station is able to recreate the unique identifier that is sent and to determine whether the mobile station is paged.

In another aspect of the present disclosure, the unique identifier that uniquely identifies a mobile station that is to be paged is hashed to hash a first group of bits of the identifier to a first paging message and to hash a second group of the bits of the identifier to a second paging message. Multiple noncontiguous portions of the identifier are hashed to form the separate paging messages. Because noncontiguous portions of the unique identifier are used in the hashing, problems that might otherwise result from the use of contiguously-positioned bits of the unique identifier are avoided.

In another aspect of the present disclosure, when implemented in a 3GPP LTE system, the hashings that form the first group of hashed bits form a group address, a PI-RNTI value. And, the hashed bits that form the second group form a short address. The group address is sent on a first channel, e.g., a DL-CCH (Down Link Control Channel), and the second group is sent on a second channel, e.g., a PCH (Paging Channel). The first group and the second group together comprise all of the unique identifiers that uniquely identify the mobile station. If the unique identifier is 32 bits, e.g., the first group may comprise 16 bits, and the second group will then comprise the remaining 16 bits.

In another aspect of the present disclosure, the hashing of the unique identifier of the mobile station is performed to create three groups of the bits hashed from the identifier. A first group of hashed bits forms the group address, a second group forms a short address, and a third group forms a third address. The number of hashed bits of the three groups together correspond to the bits of the unique identifier.

In another aspect of the present disclosure, a single group address is used for all mobile stations. And, the group address is set to a bit that is the same for all individually directed pages, e.g., the group address is set to be 0xffff. The unique identifier of the mobile station is hashed to form a first short address and a second address.

In another aspect of the present disclosure, the mobile station wakes up to detect whether the group address associated therewith is sent on a first paging channel, such as a DL-CCH. And, the mobile station further monitors the second paging channel to detect whether a short address is communicated thereto.

In another aspect of the present disclosure, the mobile station combines the bits detected on the two paging channels and determines whether the mobile station has been paged by determining whether the combined bits correspond to the bits of the unique identifier of the mobile station.

Because fewer than all of the bits of the unique identifier are sent on the second paging channel, additional capacity is provided on the second paging channel for the performance of traffic communication services. The result is improved efficiency of use of spectrum allocated to the communication system.

In these and further aspects, therefore, an apparatus, and an associated methodology, is provided for facilitating mobile-station paging upon at least a first paging channel. A hasher is configured to hash a unique mobile station identifier into a first group of bits formed of a subset of the unique mobile station identifier. An alterer is configured to alter the first group of bits to form an altered group of bits if the first group of bits equals a reserved group of bits. A page message generator is configured to generate a first page message that includes the altered group of bits, if formed, and that otherwise includes the first group of bits.

In these and further aspects of the present disclosure, an apparatus, and an associated methodology, is provided for facilitating paging of a mobile station. A detector is configured to detect a paging message sent on a first paging channel. The paging message comprises one of a first group of bits and an altered group of bits. A determiner is configured to determine whether the paging message comprises a group identifier that identifies a mobile-station group that includes the mobile station and whether the paging message comprises a broadcast page.

Figure 1:
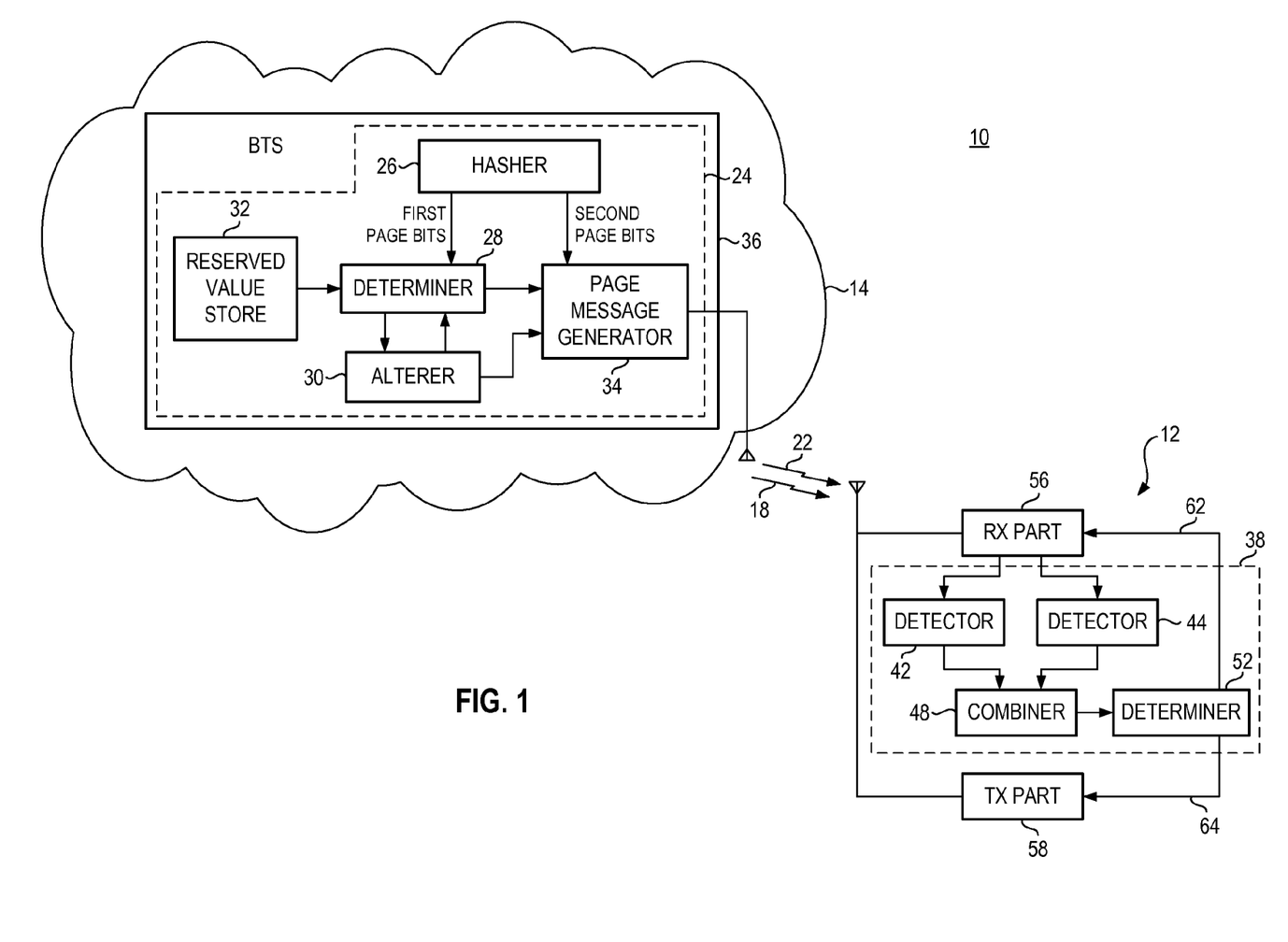
FIG. 1 illustrates a functional block diagram of a radio communication system in which an embodiment of the present disclosure is operable.

Referring first, therefore, to FIG. 1, a radio communication system, shown generally at 10, provides radio communications to mobile stations, of which the mobile station 12 is representative. The communication system, in the exemplary implementation, forms a 3GPP ($3^{rd}$ Generation Partnership Project) LTE (Long Term Evolution) system that provides for both voice and data communication services. By, and with, mobile stations, such as the mobile station 12.

When a communication service is to be performed with a mobile station, the mobile station is first paged. Paging of the mobile station alerts the mobile station of the pending communication service. And, in response, if the communication service is accepted, the mobile station enters into a state to permit its operation pursuant to the performance of the communication service.

As mentioned previously, a two-stage paging method is to be provided. That is to say, when paging a mobile station, hereinafter referred to as a UE (User Equipment) the infrastructure uses two different channels to send a page. Page messages, originated at the network 14, are sent upon channels defined upon a radio air interface that extends beyond the network 14 and the mobile stations. While the following description shall describe exemplary operation in which the communication system forms a 3GPP LTE system, the teachings set forth herein are analogously implementable in other types of communication systems.

Pursuant to paging in the 3GPP LTE-compliant system, the UE is assigned to a certain paging occasion within a DRX (Discontinuous Reception) cycle. The UE 12 wakes up and turns on its receiver and first receives a control channel, referred to as an L1/L2 control channel, a PD-CCH (Physical Downlink Control Channel), or a Downlink Control Channel (DL-CCH). The DL-CCH includes resource block assignment information. The resource block assignment may include, information such as the frequency and time to indicate to the UE in what manner to receive the associated paging message. Then, the paging message is sent on a PCH (Paging Channel) transport channel. The PCH transport channel is mapped to a PDSCH (Physical Downlink Shared Channel) physical channel.

A group address is used on the DL-CCH. The group address is sometimes referred to as a PI-RNTI. When paging a UE, the network is aware of the PI-RNTI of the UE that is to be paged, and the network uses the address to form the content of the DL-CCH message. In 3GPP specification number 36.212v200, a 16-bit cyclic redundancy check (CRC) is used for error detection of the DL-CCH. This section also specifies that, for the DL-CCH message, an exclusive OR operation is performed on the computed CRC, and an identity, i.e., the PI-RNTI. The result of the exclusive OR operation is appended to the payload. Then both the PI-RNTI and the result of the exclusive OR operation are sent on the DL-CCH. Due to the exclusive OR operation, a UE that receives the transmitted message is not able to decode the content that is intended for another UE that has another PI-RNTI.

The DL-CCH is represented by the arrow 18, and the PCH is represented by the arrow 22. The channels are defined upon the radio air interface and are monitored by the UE 12 in manners as noted above. As also noted above, the PCH is also used for traffic services to communicate voice and data traffic. An embodiment of the present disclosure provides a manner by which to increase the portion of the PCH that is available for communication of traffic data.

An apparatus 24, is embodied at a network entity, here a base transceiver station. The apparatus 24 operates, amongst other things, to alert the UE of a pending communication service. Paging is performed both to page the UE with an individually-directed page and with a broadcast page, intended to page a plurality of UEs. The apparatus 24 includes a bit sequence provider, here implemented in the form of a hasher 26. In other implementations, the bit sequence provider is implemented in other manners. The apparatus further includes a determiner 28, an alterer 30, a reserved value store 32, and a page message generator 34. The elements of the apparatus 24 are functionally represented, implementable in any desired manner, including by algorithms executable by processing circuitry. And, while the apparatus 24 is here shown to be embodied at a single network entity, here a Base Transceiver Station (BTS) 36, in other implementations, the elements are distributed amongst more than one entity.

When a communication service is to be performed with the UE 12, its unique identifier, here a TMSI, a 32-bit value, that uniquely identifies the UE is provided to the hasher 26. The hasher 26 operates to hash the bits of the TMSI, or other unique identifier, into groups of hashed bits. The groups of hashed bits are provided to the page message generator 34. The page message generator 34 forms a first message for transmission upon the DL-CCH 18 and, thereafter, a second message that is sent upon the PCH 22. The hashing is performed in a manner such that, collectively, all of the bits of the TMSI, or other unique identifier, are used in the first and second page messages.

Pursuant to an embodiment of the present disclosure, the hasher 26 provides a first group of bits to the determiner 28. More generally, the determiner 28 is provided with a bit sequence, such as that provided, generically, by a bit sequence provider. The determiner 28 compares the bits provided thereto with bits retrieved from the reserved value store 32. The retrieved bits are reserved bits, such as those reserved to identify a broadcast page. If determined to be dissimilar, the first group of bits are provided to the page message generator 34 and the page message generator 34 generates a page with the first group of bits.

If, however, determination is made that the bits correspond to the reserved bits, operation of the alterer 30 is invoked to alter. i.e., adjust, the first group of bits. Alteration and determination is iteratively performed until dissimilar bits are formed. The alteration is carried out in any desired manner, e.g., to flip one or more bits of the group, perform an XOR (Exclusive OR) or other logical operation on the first group of bits, rotation of the bits, etc.

If a broadcast page is to be generated bits corresponding to, or retrieved from, the reserved value store are used in the generation of the page message.

In a further implementation, a bit of a payload of the DL-CCH is allocated to signal whether the bit sequence has been adjusted. In such an implementation, the page message generator inserts the bit of the appropriate value to indicate whether adjustment has been made.

The UE 12 includes further apparatus, shown at 38 of an embodiment of the present disclosure. The apparatus 38 is also functionally represented, formed of entities implementable in any desired manner, including by algorithms executable by processing circuitry. The apparatus 38 includes a first detector 42, a second detector 44, a combiner 48, and a determiner 52. The UE is further shown to include transceiver circuitry, here represented by a receive (RX) part 56 and a transmit (TX) part 58.

The first detector 42 operates to detect a page message sent on the first paging channel 18, e.g., DL-CCH. When a page message is sent and delivered to the mobile station 12, the detector 42 detects its contents, provides bits of the detected contents to the combiner 48, and provides an indication to the detector 44 to monitor for the communication of a page message on the second paging channel 22. When a paging message is subsequently sent on the second paging channel 22 and delivered to the mobile station 12, the detector 44 detects its delivery. In one implementation, the detected values are provided to the determiner 52 and determination is made by the determiner as to whether the UE has been paged. Alternately, and in the illustrated implementation, the bits that are detected by the detector are first provided to the combiner 48.

In the implementation in which the combiner is utilized, the combiner 48 operates to combine the bits provided thereto by the detectors 42 and 44. The combiner combines the detected bits, such as through a hashing process, the combined values are provided to the determiner 52 at which determination is made as to whether the UE has been paged. If the created, unique identifier corresponds with the unique identifier of the mobile station, as determined by the determiner 52, a determination is made that the mobile station is being paged. Lines 62 and 64 extending to the receive and transmit parts, respectively, of the mobile station, alert the transceiver circuitry to enter into a state pursuant to performance of the communication service.

The determiner 52 is here further operable also to determine whether the bits detected by the detector 42 of the first paging message correspond to the bits used for a broadcast page. If so, the transceiver circuitry is correspondingly alerted to the pending broadcast service. The determiner 52 is further configured to identify the bit allocated to signal whether the communicated sequence has been altered.

Figure 2:
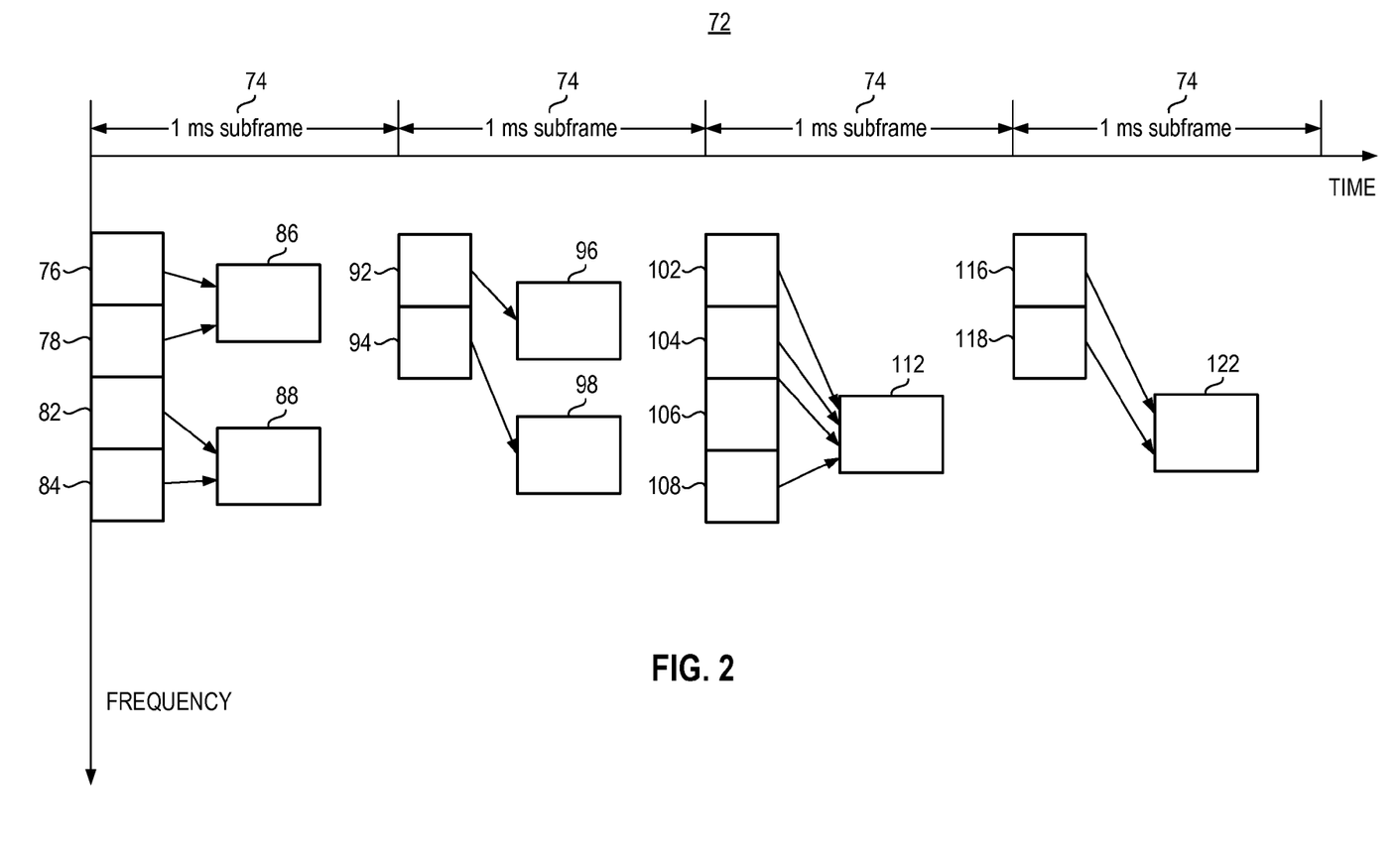
FIG. 2 illustrates a representation of an exemplary allocation of first and second paging channels during four successive sub frame time periods.

FIG. 2 illustrates a representation, shown generally at 72, of exemplary paging in a 3GPP LTE radio air interface. Here, the first four 1 ms sub frames 74 of a 10 ms frame are shown. Each sub frame 74 includes multiple DL-CCH channels, and messages sent thereon, followed by one or more pages generated on one or more paging channels.

In the first sub frame, four DL-CCHs 76, 78, 82 and 84 are shown. Each of the DL-CCHs is defined upon different OFDM sub carrier frequencies. The channels 76 and 78 here send assignment information that direct UEs to receiver their pages in a first PCH page message 86. The channels 82 and 84 here send assignment information directing UEs to receive their pages sent on a second PCH 88. Messages sent on the channels 86 and 88 are transmitted using different OFDM sub carrier frequencies.

The second sub frame 74 illustrates DL-CCHs 92 and 94. Messages generated on each of these two channels are transmitted using different OFDM sub carrier frequencies. The channel 92 has assignment information that directs a UE to receive its page on the PCH 96. The channel 94 has assignment information that directs a UE to receive its page on the PCH 98. The page messages 96 and 98 are transmitted using different OFDM sub carrier frequencies. A page message sent on the channel 96 is sent on a different set of OFDM sub carrier frequencies than those used by the channel 92. Likewise, the page message sent on the channel 98 is sent on a different set of OFDM sub carrier frequencies than the frequencies used by the channel 94.

The third sub frame 74 shows four DL-CCHs, 102, 104, 106, and 108. Each of the four channels is defined upon different OFDM sub carrier frequencies. Messages sent thereon all have assignment information directing UEs to receive their pages on a paging channel 112. The page message sent on the paging channel 112 is sent on a different set of sub carrier frequencies than those upon which any of the channels 102-108 are defined.

In the fourth sub frame 74, two DL-CCHs 116 and 118 are defined. Messages broadcast thereon both have assignment information directing UEs to receive their pages on a paging channel 122. The page message sent on the paging channel 122 is sent on a different set of sub carrier frequencies than those that define either of the channels 116 or 118.

Figure 3:
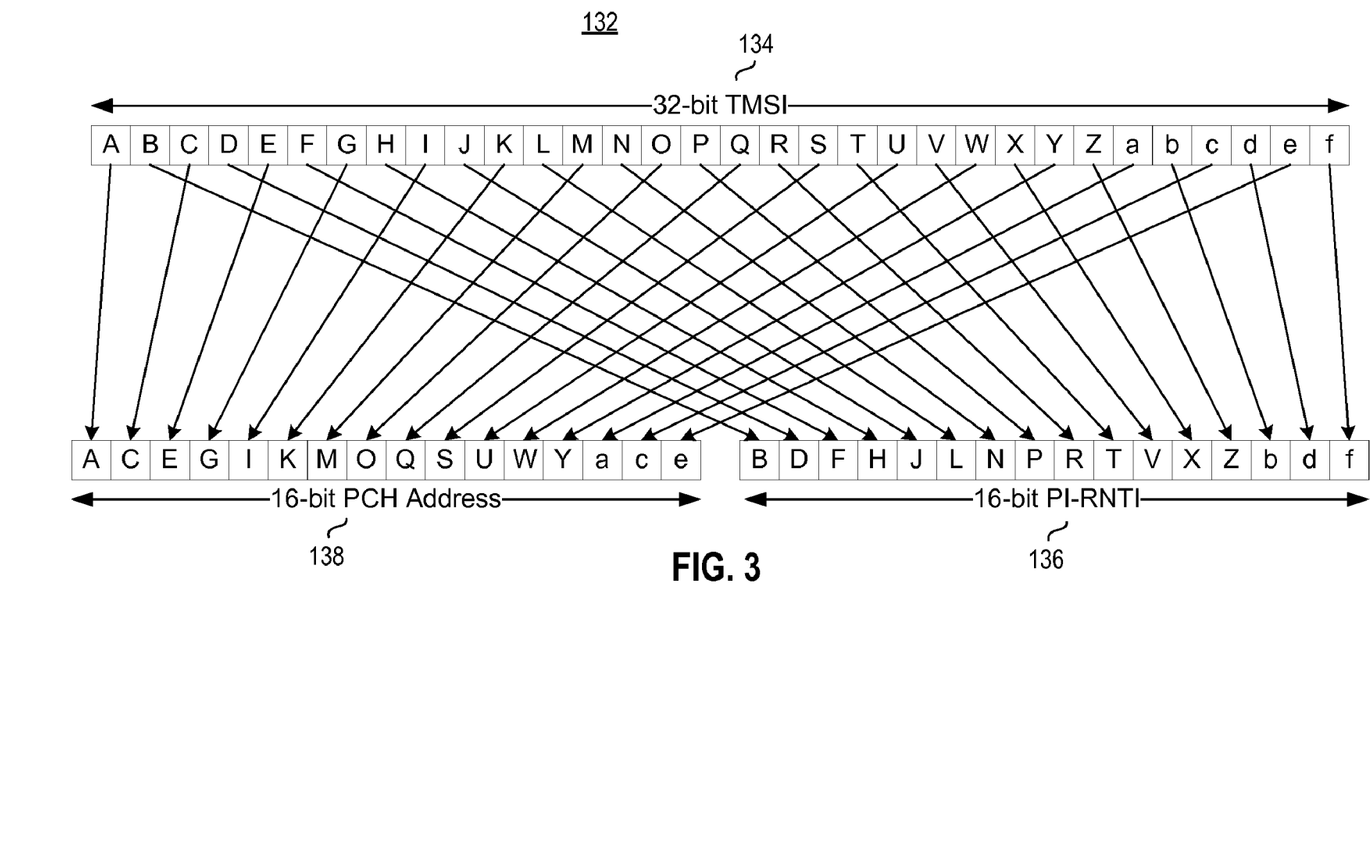
FIG. 3 illustrates exemplary hashing performed during operation of an embodiment of the present disclosure.

FIG. 3 illustrates a representation 132 representative of exemplary hashing performed pursuant to an embodiment of the present disclosure. Here, a 32-bit TMSI address 134 is hashed into two groups of hashed bits 136 and 138. The first group 136 defines a 16-bit PI-RNTI value, and the second group 138 defines a 16-bit PCH address. The PCH address is a short address that is used in a PCH page message. Hashing is performed to page the UE that is associated with the unique identifier 134. In the scheme represented in FIG. 3, all of the bits of the TMSI are divided between the groups 136 and 138 such that all of the TMSI bits are used for paging. The PI-RNTI 136 is formed of 16 of the TMSI bits. And, an address to be used on the PCH is formed of the other 16 of the TMSI bits.

TMSI assignment is performed by a core network, and the radio access network portion of the network does not have control over the TMSI assignment procedure. If the core network assigned TMSIs that were random in all 32 bits, then the mapping of the 32 TMSI bits to the groups 136 and 138 would not require hashing. If, for example, the PI-RNTI could be set to the most significant bits of the TMSI, and the 16 bit short page address were set to the least significant bits of the TMSI, the randomness would carry over to the groups of bits. However, the bits of the TMSI may not be randomly assigned. According to a simple TMSI assignment procedure, the core network could simply assign TMSIs sequentially. In this scenario, if there were a small number of UEs then all UEs would have the same PI-RNTI values, thus forcing all UEs monitoring a sub frame to monitor all PCH page messages. Battery life of the UE would be reduced.

Hashing in accordance to the representation 132 avoids this problem by assigning the PI-RNTI such that it is not simply a contiguous portion of the TMSI, and likewise assigning the short page address such that it is not simply a contiguous portion of the TMSI. The PI-RNTI is set, as shown, to the concatenation of multiple non-contiguous portions of the TMSI. Likewise, the short page address 138 is set to the concatenation of multiple non-contiguous portions of the TMSI. In this scheme, the multiple non-contiguous portions of the TMSI used to form the PI-RNTI and the short page address are all one-bit, non-contiguous portions. Alternately, some or all of the non-contiguous portions could be multi-bit, non-contiguous portions. As illustrated, the TMSI is formed of 32 bits A-f. A is the most significant bit and f is the least significant bit. The PI-RNTI 136 is formed by concatenating the even bits B . . . f of the TMSI together. The short page address 138 is formed by concatenating the odd bits A . . . e of the TMSI together. Many variations of the scheme shown in the representation 132 are, of course, possible.

One of the benefits provided by the scheme of the representation 132 is that all bits of the unique identifier are together used on the DL-CCH and the PCH. Some of the address bits are used on the DL-CCH and remaining ones of the address bits are used on the PCH. By using all of the bits to page the UE rather than a subset of the bits, any issues associated with having two UEs responding to the same page are avoided.

It should be noted that, while the exemplary representation utilizes a TMSI, in other implementations, other identifiers are used, e.g., an IMSI address or a hardware identifier. In one implementation, the infrastructure and the UE could use a first type of address, such as an IMEI on both the DL-CCH and the PCH if there is no TMSI assigned to the UE; the infrastructure and the UE would then use a second type of address such as a TMSI on both the DL-CCH and the PCH if a TMSI is assigned to the UE.

Figure 4:
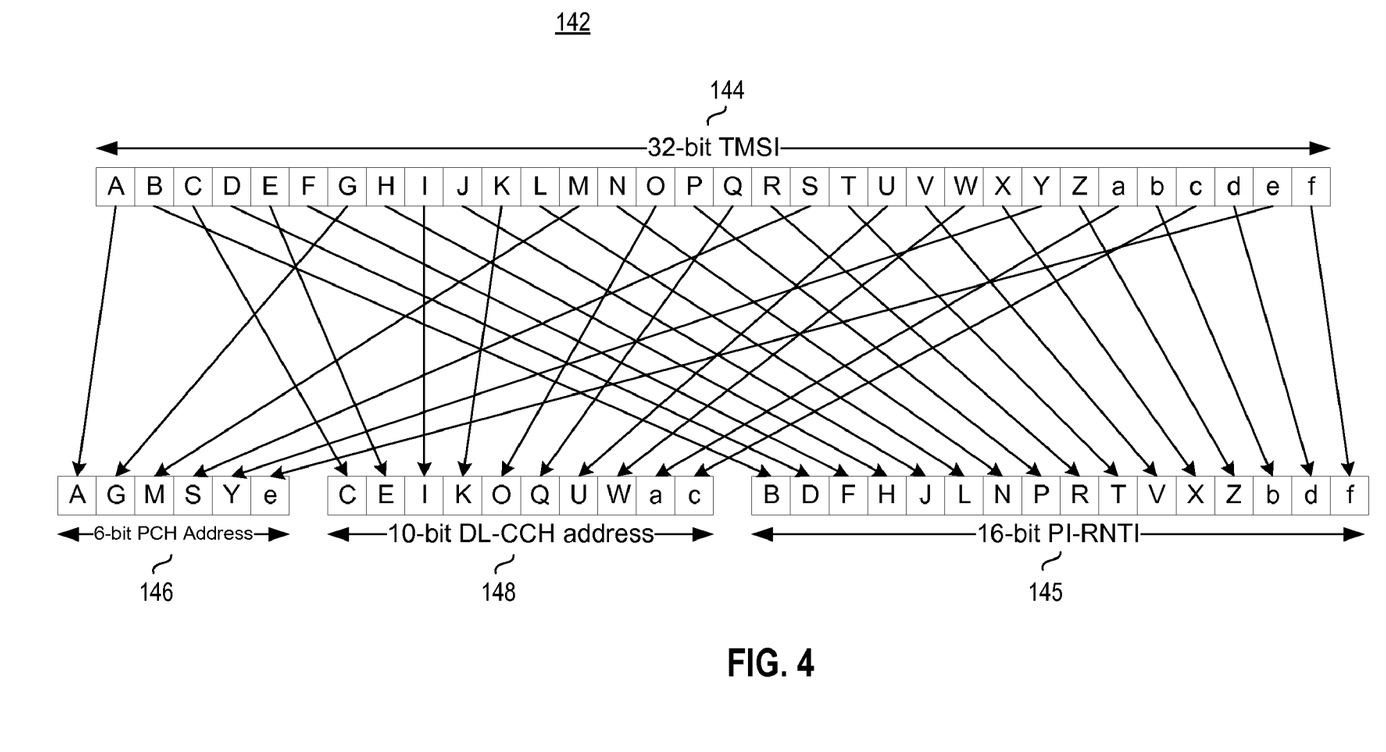
FIG. 4 illustrates a representation, similar to that shown in FIG. 3, but here showing alternate hashing performed pursuant to operation of an alternate embodiment of the present disclosure.

FIG. 4 illustrates a representation 142 of another hashing scheme utilized pursuant to an embodiment of the present disclosure. Here, the 32-bit TMSI, or other unique identifier, 144 of a UE is hashed into three groups, a first hashed group 145, a second hashed group 146, and a third hashed group 148. The first group 145 again forms a 16-bit PI-RNTI. The second group 146 forms a 6-bit short address to be used in a PCH page message. And, the third group 148 forms a 10-bit DL-CCH address. In 3GPP, the final format for the DL-CCH is not yet formulated. However, it appears that, when used for paging, there may be as many as 11 bits from the DL-CCH payload that would be unused. It is contemplated that currently unused bits are able to be allocated to carry additional address bits in order to further reduce the size of the address used on the PCH and, thus, further save capacity on the PDSCH. When a UE receives the DL-CCH and the CRC check passes, then the UE determines that the message is being sent, addressed to the PI-RNTI of the UE. The UE then compares the received DL-CCH address to its own DL-CCH address. If the two match, then the UE attempts to receive a PCH page message based upon the received assignment information. It should be noted that, adding more address bits, in addition to the PI-RNTI to the DL-CCH, reduces the probability that a UE shall receive the PCH page message in response to another UE being paged. Considerably more energy is required to receive a PCH message, thus this implementation provides battery savings. The hashing mechanism set forth in FIG. 4 is performed by the network part in order to page a UE. Analogous hashing is performed at the UE in order to receive a page. The hashing mechanism set forth in FIG. 4 divides all of the bits of the TMSI such that all of the TMSI bits are conveyed used for paging. The PI-RNTI is formed from 16 of the TMSI bits. And, in other implementations, the PI-RNTI is formed of fewer than sixteen bits. The DL-CCH address is formed another 10 bits of the TMSI. And an address to be used on the PCH is formed of the other 6 bits of the TMSI bits.

Although the scheme set forth in FIG. 4 shows that the short PCH address is six bits and that the DL-CCH address is ten bits, it should be noted that other bit lengths could be used for the DL-CCH address and for the short PCH page address. In the event that there are fewer unused bits available for paging on the DL-CCH than currently anticipated, then the DL-CCH address can be shortened and the short PCH address can correspondingly be lengthened. Alternatives include, e.g., a 7-bit, short PCH address with a 9-bit DL-CCH address, an 8-bit short PCH address with an 8-bit DL-CCH address, a 9-bit short PCH address with a 7-bit DL-CCH address, an 10-bit short PCH address, with a 6-bit DL-CCH address, etc. Various combinations are used with the entire TMSI used for paging the UE on the DL-CCH and the PCH.

In the scheme set forth in FIG. 4, the PI-RNTI is assigned such that it is not simply a contiguous portion of the TMSI. And the DL-CCH address is also assigned in a manner such that it is not simply a contiguous portion of the TMSI. And, also, the short page address is assigned such that it also is not a simply contiguous portion of the TMSI. Each of the groups of bits is set to the concatenation of multiple non-contiguous portions of the TMSI. In the scheme shown in FIG. 4, all of the hashing is of 1-bit, non-contiguous portions. In alternate schemes, some, or all, of the non-contiguous portions are instead multi-bit, non-contiguous portions. Here, the PI-RNTI is formed by concatenating the even bits of the TMSI together. The DL-CCH address is formed by concatenating a first group of odd bits and the short page address is formed by concatenating a second group of odd bits together. Many variations of the scheme shown by the representation 142 are possible.

A benefit associated with the hashing scheme of the representation 142 is that all bits of the address 144 are used on the DL-CCH and the PCH. Some of the address bits are used on the DL-CCH, and the remaining address bits are sent on the PCH. By using all of the bits to page the UE instead of a subset of the bits, any issues associated with having two UEs respond to the same page are avoided.

Here, again, while a TMSI address forms the identifier 144 in the exemplary implementation, in other implementations, other unique identifiers, such as an IMSI or a hardware identifier are instead used. Again, in one implementation, the infrastructure and the UE could comprise a first type of address such as an IMEI on both the DL-CCH and the PCH if there is no TMSI assigned to the UE; the infrastructure and the UE would then use a second type of address such as a TMSI on both the DL-CCH and the PCH is a TMSI is assigned to the UE.

Figure 5:
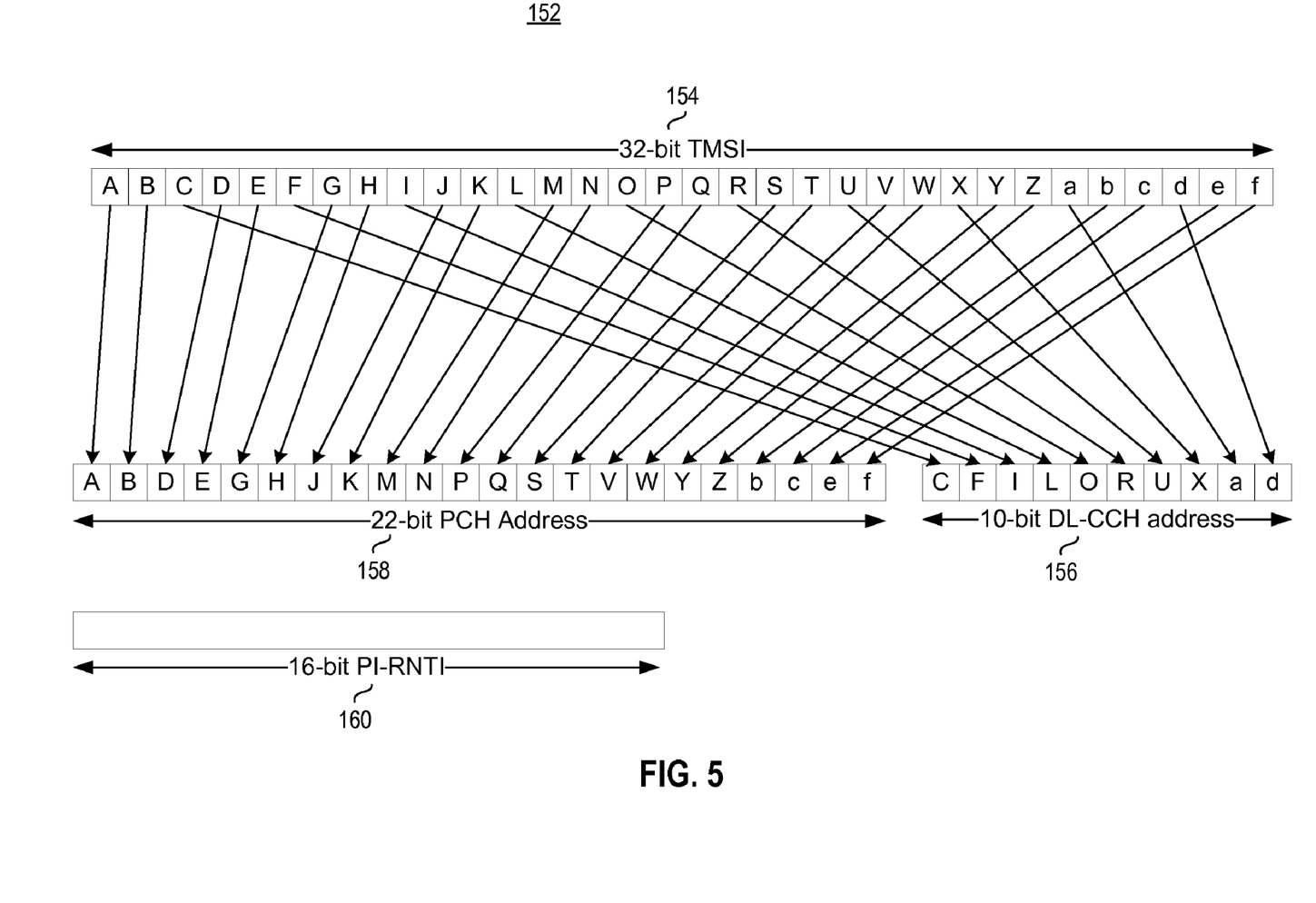
FIG. 5 illustrates another representation, similar to those shown in FIGS. 3-4, but representative of alternate hashing performed pursuant to another alternate embodiment of the present disclosure.

FIG. 5 illustrates a representation 152 of another hashing scheme used pursuant to operation of another embodiment of the present disclosure. Here, again 32-bit TMSI 154 is hashed into a first group of hashed bits 156 and a second group of hashed bits 158. In this scenario, it is assumed that a single PI-RNTI value 160 is used for individually directed pages to all UEs. That is to say, the same PI-RNTI 160 is used to page all UEs. The PI-RNTI 160 is set to a value, such as, e.g., 0xffff or any other value. As the PI-RNTI is set to a fixed value for all individually directed pages, the PI-RNTI is not used to convey address bits of the unique identifier of a UE. The scheme set forth in FIG. 5 shows an example of a manner by which to hash a 32-bit TMSI address 154 to a 22-bit short address 158 to be used in the PCH page message, and a 10-bit, DL-CCH address 156. When a UE receives the DL-CCH-sent message, and the CRC check passes with the PI-RNTI 160, the UE determines that the DL-CCH message is part of an individually-directed page. The UE then compares the received DL-CCH address to its own DL-CCH address. If the two match, then the UE attempts to receive a PCH page message based upon the received assignment information. The hashing mechanism represented in FIG. 5 is performed at the network and a corresponding hashing procedure is performed at the UE. Again, all of the bits of the TMSI 154 are included, collectively, in the group 156 and group 158. Again, while in the exemplary implementation, the first group is of a 10-bit length and the second group 158 is of 22-bit length, in other implementations, the addresses 156 and 158 are formed of other lengths, analogous to the scenario set forth above with respect to FIGS. 3 and 4. Additionally, again, the hashing is performed in a manner such that multiple, non-contiguous portions of the TMSI are hashed and concatenated together. In other implementations, multiple, non-contiguous portions of the TMSI are used to form the first and second groups 156 and 158. And, again, in other implementations, other values, other than the TMSI, such an IMSI or other hardware identifier, is instead utilized and hashed. Again, in one implementation, the infrastructure and the UE could use a first type of address such as an IMEI on both the DL-CCH and the PCH if there is no TMSI assigned to the UE; the infrastructure and the UE would then use a second type of address such as a TMSI on both the DL-CCH and the PCH if a TMSI is assigned to the UE.

Figure 6:
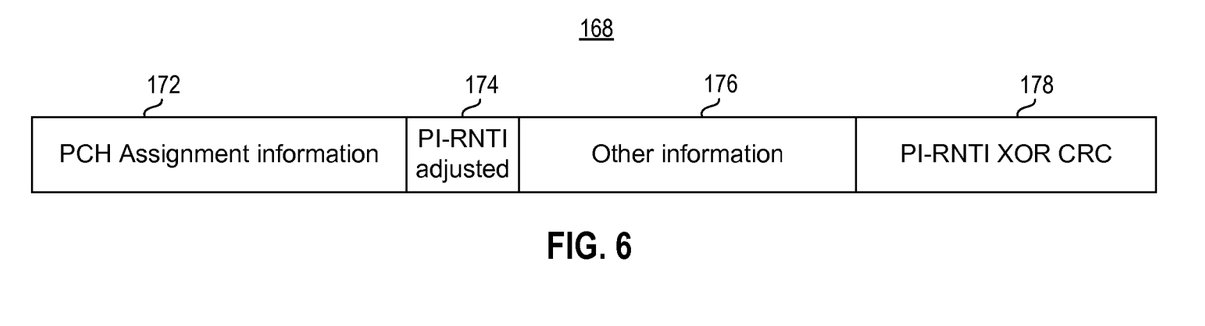
FIG. 6 illustrates an exemplary message format of an exemplary message generated pursuant to operation of the radio communication system shown in FIG. 1 of an embodiment of the present disclosure.

FIG. 6 illustrates an exemplary DL-CCH message, shown at 168, used for an individually directed page. The message includes a PCH assignment information field 172, a PI-RNTI adjusted field 174, an other information field 176, and an error detecting code field 178.

The PCH assignment information field 172 includes information to direct a UE how to receive a PCH message. For example, with respect to the example shown in FIG. 2, the information in the PCH assignment information field 172 of the channel 76 informs the UE of the PCH page 86. The information in the PCH assignment information field 172 would indicate which OFDM sub carrier frequencies are used for the PCH page. Additional information includes, e.g., items such as a time off set until the beginning of the PCH page or a timed duration of the PCH page. The field 174 indicates to the UE whether the PI-RNTI of the UE is adjusted in order to avoid a collision with a reserve PI-RNTI. The field 174 is used, e.g., to ensure that the UE is uniquely addressed. Alternately, the PI-RNTI adjusted field 174 is omitted if it is not imperative that the UE be addressed uniquely. The field 176 includes other information and consists, e.g., of reserved bits. The error detecting code field 178 is set to the PI-RNTI exclusive-ORed with a CRC computed over the fields of the message.

Figure 7:
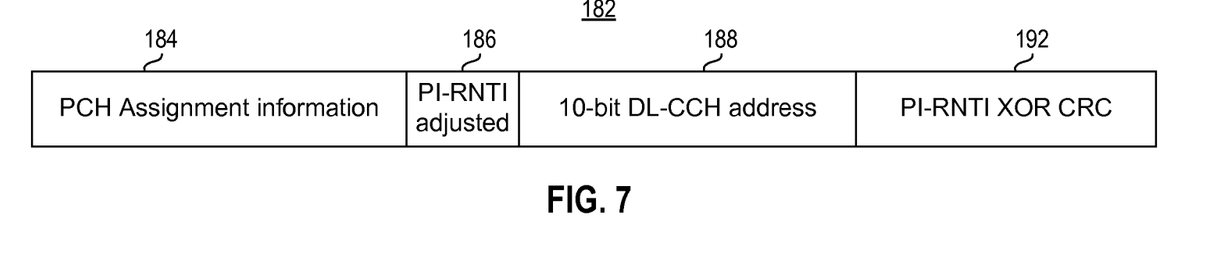
FIG. 7 illustrates a representation, similar to that shown in FIG. 6, but of an alternate message generated pursuant to an alternate embodiment of the present disclosure.

FIG. 7 illustrates another exemplary DL-CCH message, shown at 182, used for an individually-directed page. The message includes a PCH assignment information field 184, a PI-RNTI adjusted field 186, a 10-bit DL-CCH address field 188, and an error detecting code field 192. The fields 184, 186, and 192 are analogous to those set forth above with respect to the message 168 shown in FIG. 6.

The field 188 is used to carry more bits of the UE address and corresponds to the address 146 shown in FIG. 4. Different types of hashing, other than those set forth in FIG. 4 can be used to form the bits of the field. And, lengths other than 10 bits can also be used.

Figure 8:
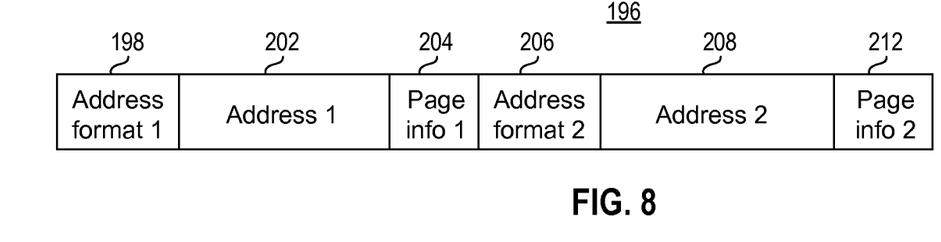
FIG. 8 illustrates a representation of another exemplary message generated pursuant to operation of an embodiment of the present disclosure.

FIG. 8 illustrates portion 196 of an exemplary PCH message that is used to page two UEs. Fields present in an actual page message, such as header bits, a message ID, and an error detecting code are not shown. The PCH page message is used to page at least one UE and can be used to page two or more UEs by including multiple page records in the message. The example shown in FIG. 8 shows two page records. The first page record comprises an address format field 198, an address field 202, and a page info field 204. The second page record comprises an address format field 206, and address field 208, and a page info field 212.

The address format field 198 includes information about the address field 202. The address format field 198 is indicative of the length of the address field 202. The address format field 198 may specify the type of address if multiple types of address are used for paging. Possible address types include, e.g., a TMSI, an IMSI, and a hardware identifier. Alternately, the type of address could be specified by another field if multiple address types were supported at the same time. The address format field 198 may be a single-bit field if there is only one type of address possible and only two possible lengths. Alternately, the address format field 198 may be a multi-bit field. The address field 202 includes either the UE identity or a hashed portion of the UE identity.

The page info field 204 includes information about the page. This information is, for example, the service that is causing the UE to be paged. Knowing the service that caused the page can help the UE to request set up of the appropriate resources when the UE responds to the page. The page info field 204 may also include other information. The fields 206-212 are analogous to the fields 198-204.

Figure 9:
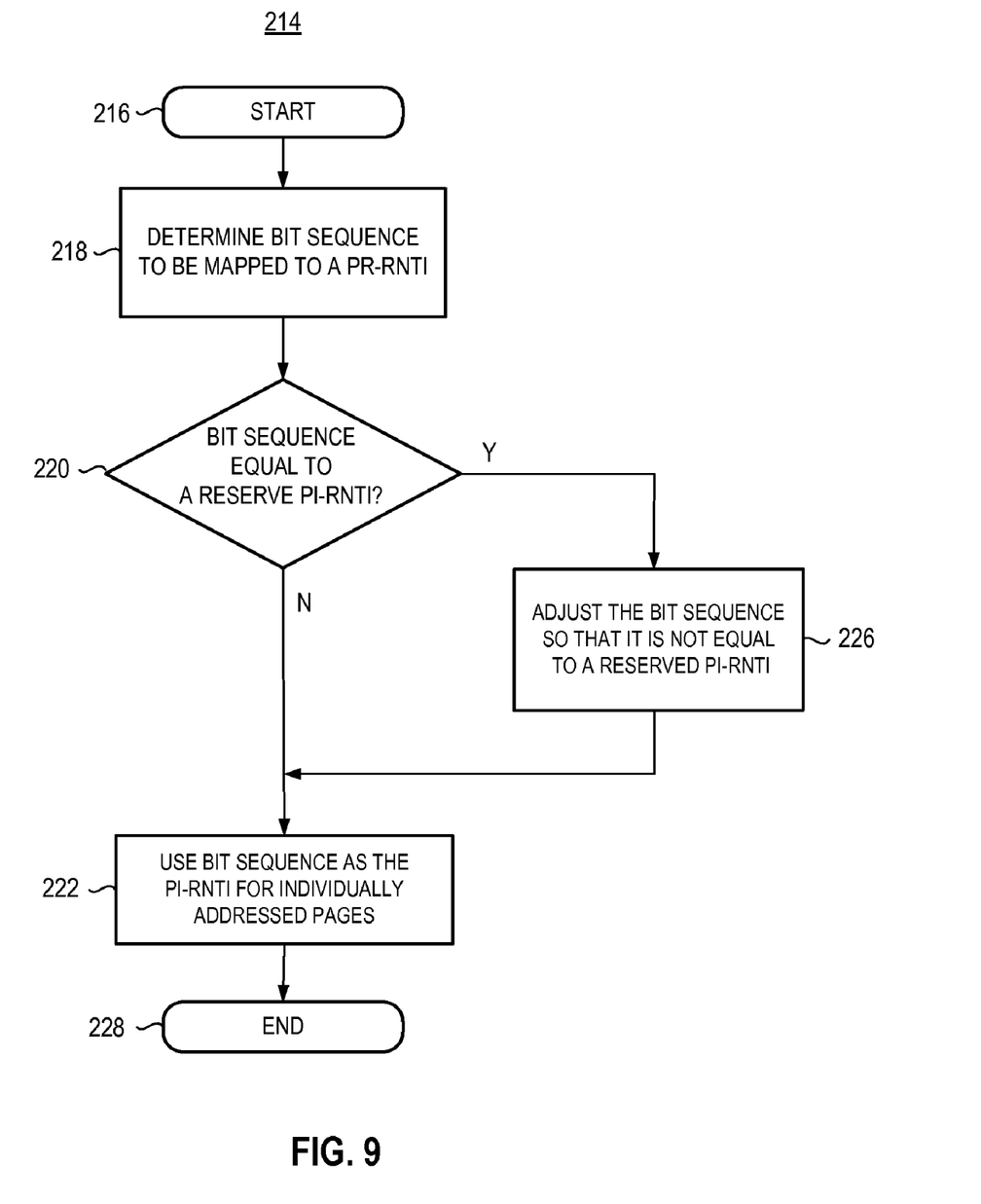
FIG. 9 illustrates a process diagram representative of the process of an exemplary embodiment of the present disclosure.

FIG. 9 illustrates a process diagram, shown generally at 214, representative of an exemplary procedure carried out pursuant to an embodiment of the present disclosure by which to ensure that first hash bits intended to form a PI-RNTI do not conflict with a reserved address, reserved as a broadcast address. The process is usable in network infrastructure in the UE to avoid a conflict between a bit sequence to be mapped to a PI-RNTI and a reserved PI-RNTI, e.g., reserved as a broadcast address.

Subsequent to commencement of the process, indicated by the start block 216, a determination is made, indicated by the block 218, of a bit sequence to be mapped to a PI-RNTI. In the exemplary implementation, the bit sequence forms a first group of hashed bits, formed in a manner such as one of those shown in FIGS. 3, 4, and 5, described above. That is to say, the bit sequence comprises, e.g., a 16-bit PI-RNTI hashed from a TMSI address, such as that described with respect to FIGS. 3-5. Alternately, the bit sequence comprises hashed bits from any of various other addresses desired to be used as the PI-RNTI. Both the UE and the network part have knowledge as to which PI-RNTI values are reserved. One or more values are reservable.

Subsequent to determination of the bit sequence, a determination is made, indicated by the decision block 220, as to whether the bit sequence is equal to the reserved address. If not, the no branch is taken to the block 222, and the bit sequence is used as the PI-RNTI for individually-addressed pages.

If, conversely, the bit sequence is determined at the decision block 220 to equal that of a reserved address, then the yes branch is taken to the block 226. At the block 226, the bit sequence is altered, so that it is not equal to the reserved address. A path is then taken to the block 222, and the adjusted bit sequence is used as the identifier for the individually addressed pages. The path is then taken to the end block 228. Adjustment of the bit sequence is carried out in any of various manners. In one implementation, the most significant bit of the bit sequence is simply flipped. The bit sequence is, e.g., exclusive-ORed with a value 0x8000. If the most significant bit is altered, up to half of the bit sequences are reservable. Any values of the PI-RNTI are reservable as long as no two values have the same most significant bit.

In another implementation, other values, such as 0x4000, 0x2000, 0x1000, 0x0800, . . . , and 0x0001 could be exclusive-ORed with the bit sequence to produce a new bit sequence. In another implementation, the unique mobile station identifier that is hashed to form the first group of hashed bits that form a bit sequence is rotated.

A potential consequence of using an adjusted bit sequence for the PI-RNTI would be that the UE address bits used for paging would have a small but non-zero probability, of being the same as the address bits for the paging of another UE with a non-adjusted bit sequence. That is to say, there would be a small possibility that pages are not unique. One manner by which to avoid this consequence allocates a bit of the payload of the DL-CCH to signal whether the bit sequence is adjusted. The infrastructure signals this information to the UE that is paged. When a UE successfully decodes the DL-CCH, the UE checks the status of the bit and only responds to the message content if the bit matches its own status. That is to say, if the bit indicates an adjusted bit sequence and the UE's PI-RNTI bit sequence is adjusted, the UE continues processing of the page. Or, if the bit indicates no adjustment, and the UE's PI-RNTI bit sequence is not adjusted, the UE processes the page. If the status of the bit does not match the UE's own status, the UE does not receive a page based upon the message.

Figure 10:
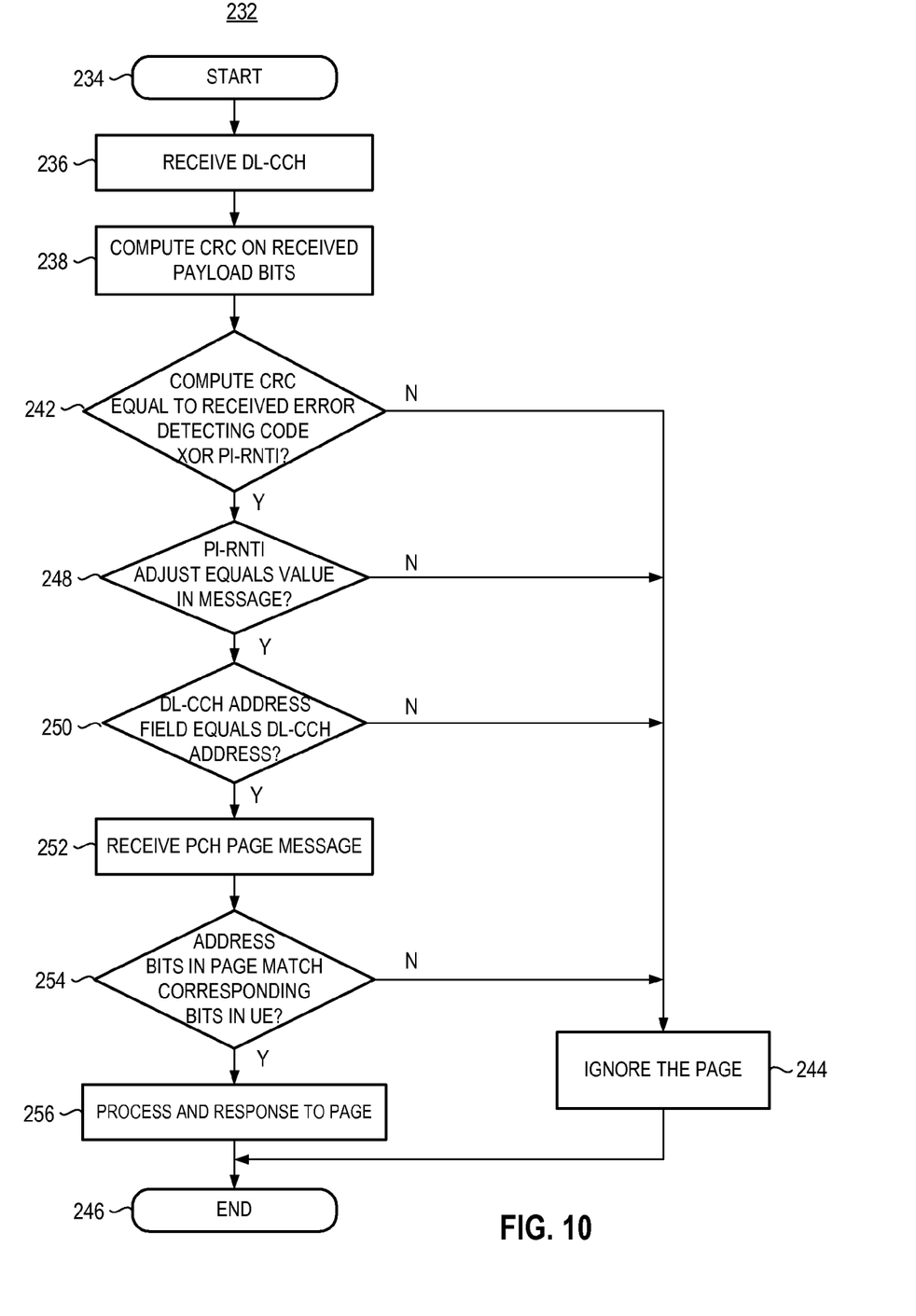
FIG. 10 illustrates a process diagram representative of the process of an exemplary embodiment of the present disclosure.

FIG. 10 illustrates a procedure 232 of an embodiment of the present disclosure by which a UE receives a page. Subsequent to the start at the start block 234, the UE receives, indicated by the block 236, a DL-CCH message sent on a DL-CCH. As indicated by the block 238, the UE computes a CRC on the received DL-CCH payload bits. Exemplary payload bits are shown in the example message 182 shown in FIG. 7.

Processing continues, and a determination is made at the decision block 242 at which the UE compares the computed CRC with the received error detecting code, such as represented by the field 192 shown in FIG. 7, exclusive-ORed with the PI-RNTI of the UE. If the result of the decision 242 is negative, processing continues at the block 244 where the UE ignores the page and then ends at the block 246.

If, conversely, the result of the operation 242 is positive, the yes branch is taken to the block 248. If there is no PI-RNTI adjusted field, then the operation 248 is not required. And, processing, instead, continues at the decision block 250 rather than the decision block 248.

At the step 248, the UE compares the PI-RNTI adjusted field from the message with its own value. If the result of the determination is negative, a path is taken to the block 244 where the UE ignores the page and then ends at the end block 246.

If, conversely, a positive determination is made at the decision block 248, processing continues at the decision block 250. The operation 250 is optional if a DL-CCH address field is not included. If a DL-CCH address is not included, processing continues at the block 252 rather than at the decision block 250. At the step 250, the UE compares the DL-CCH address field from the message with its DL-CCH address. If the result of the comparison is negative, processing continues at the block 244. Conversely, if the result of the operation 250 is positive, processing continues at the block 252. At the function 252, the UE receives the PCH page message to which it is directed by the DL-CCH. After the step 252, processing continues at the decision block 254.

At the decision block 254, the UE compares its own address bits to address bits from records of the page message. The UE determines there to be a match if one of the address fields is the same as the UE's corresponding bits. If the result of the comparison is negative, the no branch is taken to the block 244. Otherwise, if the comparison is positive, processing continues at the block 256 where the UE processes and responds to the page record of the message that had the matching address bits. Processing ends at the end block 246.

Figure 11:
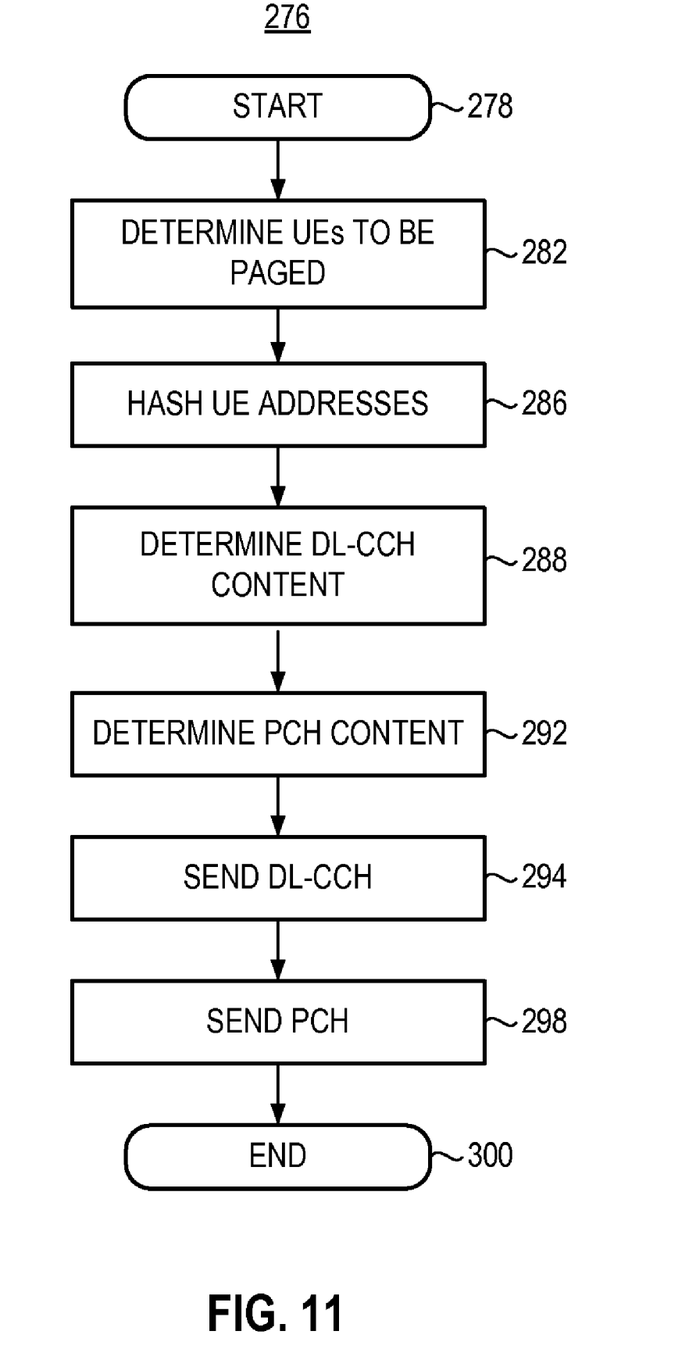
FIG. 11 illustrates a message sequence diagram representative of the method of operation of an embodiment of the present disclosure.

FIG. 11 illustrates a method flow diagram, shown generally at 276, representative of the method of operation of an embodiment of the present disclosure. The method provides a procedure to send pages in a frame. The procedure starts at the start block 278.

At the block 282, the infrastructure determines the UEs to be paged. The UE is paged, e.g., to inform the UE of an incoming phone call or in order to deliver data to the UE pursuant to a data communication service.

Thereafter, and as indicated by the block 286, the addresses of the UEs that are being paged are hashed. If more than one UE is paged, each of the addresses of each of the UEs is hashed. In one implementation, hashes are performed at an earlier time and the hashed bits are stored in subsequently retrieved in substitution for the hashing of the operation 286. Then, and as indicated by the block 288, a determination is made that the DL-CCH content of the DL-CCHs in the frame. And, as indicated by the block 292, a determination is made of the PCH content.

Then, as indicated by the block 294, the DL-CCH is sent. And, as indicated by the block 298, the PCH is sent. The operations 288-298 are repeated if there are so many pages that multiple sub frames of a frame are required for the pages. Subsequent to the operation 298, the process ends, indicated by the end block 300.

Presently preferred embodiments of the disclosure and many of its improvements and advantages have been described with a degree of particularity. The description is of preferred examples of implementing the disclosure, and the description of preferred examples is not necessarily intended to limit the scope of the disclosure. The scope of the disclosure is defined by the following claims.

What is claimed is:

1. An apparatus for facilitating mobile-station paging upon at least a first paging channel, said apparatus including at least one hardware processor and comprising:
   a bit sequence provider configured to provide a first group of bits;
   an alterer configured to alter the first group of bits to form an altered group of bits if the first group of bits equals a reserved group of bits;
   a determiner configured to determine whether the first group of bits equals the reserved group of bits;
   a page message generator configured to generate a first page message that includes the altered group of bits, if formed, and that otherwise includes the first group of bits; and
   wherein said determiner and said alterer are configured to iteratively make determinations and to form an altered group of bits until the altered group of bits no longer equals the reserved group of bits.

2. The apparatus of claim 1 wherein said alterer is configured to alter a bit of the first group of bits to form the altered group of bits.

3. The apparatus of claim 2 wherein said alterer is configured to alter a most significant bit of the first group of bits.

4. The apparatus of claim 1 wherein said alterer is configured to perform an exclusive OR operation upon the first group of bits.

5. The apparatus of claim 4 wherein said alterer is configured to perform the exclusive OR operation upon the first group of bits with a selected operator value.

6. The apparatus of claim 1 wherein said alterer is configured to rotate the first group by a selected number of bits.

7. The apparatus of claim 1 wherein the reserved group of bits comprises a plurality of reserved groups of bits.

8. The apparatus of claim 1 wherein said bit sequence provider comprises a hasher configured to hash a unique mobile station identifier into the first group formed of a subset of the unique mobile station identifier.

9. The apparatus of claim 8 wherein said hasher is further configured to hash the unique mobile station identifier into a second group of bits, the first group of bits and the second group of bits together comprising all bits of the unique mobile station identifier, and wherein said page message generator is further configured to generate a second page message that contains the second group of bits.

10. The apparatus of claim 1 wherein the first group of bits comprises first multiple non-contiguous portions of a unique mobile station identifier.

11. A method for facilitating mobile-station paging upon a first paging channel in a radio communication system, said method performed by at least one hardware processor and comprising:
grouping a subset of unique mobile station identifier bits into a first group of bits;
determining whether the first group of bits equals a reserved group of bits;
altering the first group of bits to form an altered group of bits if the first group of bits equals the reserved group of bits;
generating a first page message that includes the altered group of bits, if formed, and that otherwise includes the first group of bits; and
wherein said determining and said altering are iteratively performed until the altered group of bits no longer equals the reserved group of bits.

12. The method of claim 11 wherein said altering comprises altering a bit of the first group of bits.

13. The method of claim 11 wherein said altering comprises rotating the first group of bits.

14. The method of claim 11 wherein said altering comprises altering the first group of bits to altered bits that unambiguously identify a group address.

15. An apparatus for facilitating paging of a mobile station, said apparatus comprising:
a detector configured to detect a paging message sent on a first paging channel, the paging message comprising one of a first group of bits and an altered group of bits, the altered group of bits being the first group of bits altered in a selected way, after a determination is made that the first group of bits was equal to a reserved second group of bits that are reserved for broadcast on the first paging channel; and
a determiner configured to determine, based at least in part on the first group of bits, whether the paging message comprises a group identifier that identifies a mobile-station group that includes the mobile station and whether the paging message comprises a broadcast page.

16. A method for facilitating paging of a mobile terminal in a radio communication system, said method comprising:
detecting, at a detector, a paging message sent on a first paging channel, the paging message comprising one of a first group of bits and an altered group of bits, the altered group of bits being the first group of bits altered in a selected way, after a determination is made that the first group of bits was equal to a reserved second group of bits that are reserved for broadcast on the first paging channel; and
determining, based at least in part on the first group of bits whether the paging message comprises a group identifier that identifies a mobile-station group that includes the mobile station and whether the paging message comprises a broadcast page.

* * * * *

UNITED STATES PATENT AND TRADEMARK OFFICE
CERTIFICATE OF CORRECTION

| | |
|---|---|
| PATENT NO. | : 8,190,177 B2 |
| APPLICATION NO. | : 11/972510 |
| DATED | : May 29, 2012 |
| INVENTOR(S) | : Zhijun Cai |

It is certified that error appears in the above-identified patent and that said Letters Patent is hereby corrected as shown below:

On the Title Page, Item (56), Line 2 (Foreign Patent Documents), Delete "0030375" and insert -- 2000030375 --, therefor.

Column 16, line 29, Claim 16, After "bits" insert -- , --.

Signed and Sealed this
Fourteenth Day of August, 2012

David J. Kappos
*Director of the United States Patent and Trademark Office*